Figure 18:
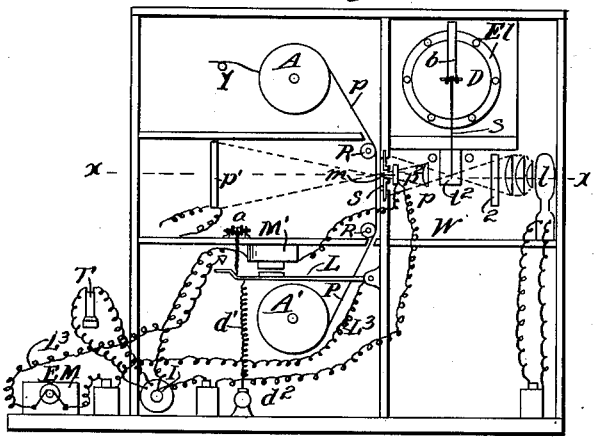

C. E. FRITTS, DEC'D.
J. H. FRITTS, ADMINISTRATRIX.
RECORD OF PULSATIONS OF SOUND AND ANALOGOUS PHENOMENA AND PROCESS AND APPARATUS FOR PRODUCING THE SAME.
APPLICATION FILED JUNE 22, 1912.
1,213,614. Patented Jan. 23, 1917.
3 SHEETS—SHEET 1.
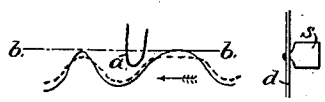
Fig. 1.   Fig. 2.   Fig. 3.
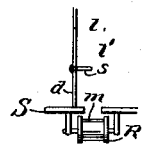
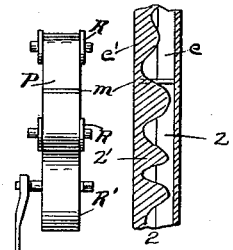
Fig. 4.
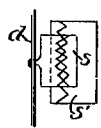
Fig. 5.   Fig. 6.
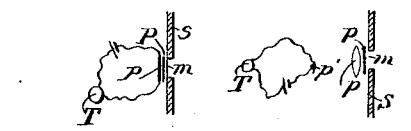
Fig. 9.   Fig. 10.
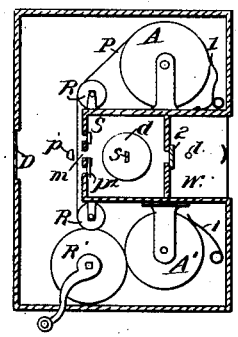
Fig. 7.
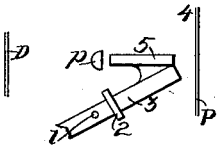
Fig. 8.
WITNESSES:
F. C. Gibson.
C. S. Brown.
INVENTOR
Josephine H. Fritts
Administratrix of the Estate of
BY Charles Edgar Fritts Deceased
John M. Cait
Attorney C. E. FRITTS. DEC'D.
J. H. FRITTS, ADMINISTRATRIX.
RECORD OF PULSATIONS OF SOUND AND ANALOGOUS PHENOMENA AND PROCESS AND APPARATUS FOR PRODUCING THE SAME.
APPLICATION FILED JUNE 22, 1912.
1,213,614.
Patented Jan. 23, 1917.
3 SHEETS—SHEET 2.
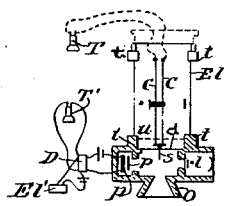
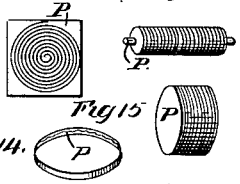
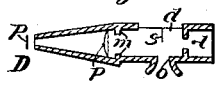
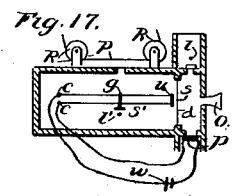

C. E. FRITTS, DEC'D.
J. H. FRITTS, ADMINISTRATRIX.
RECORD OF PULSATIONS OF SOUND AND ANALOGOUS PHENOMENA AND PROCESS AND APPARATUS FOR PRODUCING THE SAME.
APPLICATION FILED JUNE 22, 1912.

1,213,614.

Patented Jan. 23, 1917.
3 SHEETS—SHEET 3.

UNITED STATES PATENT OFFICE.

CHARLES EDGAR FRITTS, DECEASED, LATE OF ONEONTA, NEW YORK, BY JOSEPHINE H. FRITTS, ADMINISTRATRIX, OF ONEONTA, NEW YORK, ASSIGNOR, BY MESNE ASSIGNMENTS, TO JOHN D. MYERS. OF PHILADELPHIA, PENNSYLVANIA.

RECORD OF PULSATIONS OF SOUND AND ANALOGOUS PHENOMENA AND PROCESS AND APPARATUS FOR PRODUCING THE SAME.

1,213,614.  Specification of Letters Patent.  Patented Jan. 23, 1917.

Original application filed October 22, 1880, Serial No. 19,313. Divided and this application filed June 22, 1912. Serial No. 705,347.

*To all whom it may concern:*

Be it known that CHARLES EDGAR FRITTS, now deceased, but formerly a citizen of the United States residing at Oneonta, in the county of Otsego and State of New York, did invent a new and useful Improvement in Records of Pulsations of Sound and Analogous Phenomena and Processes and Apparatus for Producing the Same, of which the following is a specification.

This invention relates to recording variations or pulsations in sounds, light or electric currents in a permanent or tangible form and reproducing the same at will not merely at the instrument alone, but also at any other instrument suitably connected therewith.

The present application is a division of the original application, Serial No. 19,313, filed October 22, 1880, and relates to one of the forms of record shown and described in said original application.

The present invention includes the application of photography and electricity for recording and reproducing the variations or pulsations above mentioned by the aid of a diaphragm or equivalent device capable of vibrating under those influences, and particularly under the influence of sounds as hereinafter fully set forth.

For convenience of description the apparatus disclosed for utilizing the record produced will be called a phonograph, but it is to be expressly understood that it is not the intention to limit the scope of the invention to what is commonly known as or done by the so-called phonographs or to narrow or restrict the scope of the invention in any way, but the term is used merely for convenience.

The novel features of the invention will be apparent from the following description taken in connection with the accompanying drawings.

Figure 19:
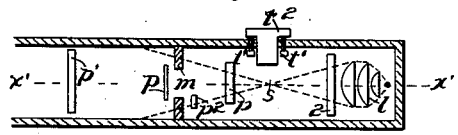
Figure 20:
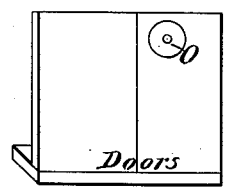

In the drawings: Figure 1 is a diagrammatic view illustrating the defective result of attempting to produce a phonograph record by indenting the blank. Fig. 2 is an edge view of a speaking diaphragm having a shutter mounted thereon such as may be used in carrying out my invention. Fig. 3 is a view partly broken away showing a speaking diaphragm carrying a shutter, a source of light and a roller carrying a sensitive strip exposed to said light through an opening controlled by said shutter. Fig. 4 shows at the left a plan view of the sensitive strip and rollers and at right an enlarged plan view of a portion of the strip having the photographic record thereon. Fig. 5 shows two additional forms of shutters which may be used. Fig. 6 shows the form of record produced by the shutter shown in Fig. 5. Fig. 7 is a vertical sectional view of one form of apparatus arranged for making the negative or pattern and moving it along by hand in carrying out my invention. Fig. 8 is a diagrammatic view showing means for reproducing and utilizing an opaque record by reflected light. Fig. 9 shows an electric circuit having a selenium bar therein adapted to be affected by light from my record. Fig. 10 is a similar view showing a flat selenium cell with a lens for concentrating the light from the record on it. Fig. 11 is a sectional view of an apparatus which may be used either for making or utilizing the record. Fig. 12 is a plan view of a disk record having the photographic impressions thereon in a spiral. Fig. 13 is a perspective view of a cylinder having a spiral record thereon. Fig. 14 is another form of record having thereon a single circular pattern. Fig. 15 is still another form showing separate parallel patterns. Fig. 16 is a sectional view of an apparatus for taking and reproducing the record having a lens for concentrating the light upon the strip. Fig. 17 is a sectional view of an apparatus adapted to strengthen light pulsations which are recorded or reproduced. Fig. 18 is a general view of the apparatus disclosed in Fig. 7 but more in detail showing more clearly the arrangement and connection of the parts. Fig. 19 is a horizontal section on the line $x$—$x$, Fig. 18. Fig. 20 is a perspective view of the doors for the apparatus shown in Fig. 18. Fig. 21 is a view of a record strip varying in density longitudinally in accordance with the present invention.

The great trouble with photographs heretofore is that they have undertaken to record and reproduce delicate air pulsations by crude and clumsy mechanical means. In the operation of the methods heretofore used the metal point used for indenting the record is hindered in its vibrations by the labor of impressing its motion in the foil or other material used in its place. This resistance not only retards the diaphragm itself, but it retards it in a very variable manner. When the tracer point reaches a soft, thin or unsupported spot in the foil it moves farther than the average, while thick or hard spots, reduce the motion below the average. A score of other faults could be mentioned, but the most important is that when the point is descending, the pressure of the foil against its inclined forward surface retards the motion of the diaphragm; but when ascending, it hastens or assists it, thus deforming the vibrations of the diaphragm itself. This will be understood by examining Fig. 1, where $a$ is the tracer point, with its front surface inclined backward to prevent clogging. The dotted line $b$—$b$ represents the original level of the foil, which is fed along in the direction of the arrow, and the solid curved line shows the actual form of a supposed sound wave, while the dotted curve shows the form which the point will tend to make,—and this discrepancy will be aggravated by the stiffness of the foil, the weakness of the vibration or the spring of the tracer, and many other causes.

The present invention is designed as one means for obviating the difficulties above described and this is accomplished by dispensing entirely with the tracer and its spring and the foil or any substitute for it, or any mechanical pressure devices whatever, for recording the sound waves tangibly. The present invention employs means for recording the vibrations of the diaphragm which neither retard nor accelerate them, but will truly record the most extreme or violent, or the gentlest pulsations, and every one exactly as it occurred. This is done by causing the diaphragm as it vibrates to vary the quantity of light which passes through an aperture to a surface sensitive to light by which the sound waves are fixed and recorded. No matter how many or how different the sounds which are joined in producing the composite sound waves which strike the diaphragm, the true number and intensity of every one of them will thus be preserved unchanged by the process of recording. This record is called the negative and from it can be produced copies or duplicates in the same or other materials and they can be used for the reproduction of the sounds recorded thereon.

The record of sound after it is produced as above described is utilized to operate a speaking diaphragm by throwing upon it light whose intensity has been varied correspondingly with the form of the sound waves recorded as before described which, as is known, causes the diaphragm to vibrate and produce the sounds corresponding to those waves. To accomplish this a powerful beam of light is passed through the negative previously prepared to and upon the diaphragm. This light passes through a narrow slit corresponding to the one used in making the negative, and by moving the negative along behind this slit at the same speed as when making the negative, it is evident that the original variations in the intensity of the light are exactly reproduced, and if they are thrown upon the diaphragm it will give out the same sound as that which originally caused it to vibrate. Thus, instead of trying to shove the diaphragm back and forth by machinery some hundreds or thousands of times per second, at a constantly varying speed, and making each motion exactly according to a prescribed pattern, each one of which may be different from any of the others, the same end in the present invention is accomplished by the slow motion of a single piece or negative, and causing that to control the action of a beam of light directed upon the diaphragm.

Instead of the light beam passing through a transparent negative, it may be thrown upon an opaque negative and the image of the pattern be reflected therefrom and utilized, or the intensity of the light thrown upon the diaphragm may be automatically varied by the negative in many other ways.

In making the negatives, the sound to be recorded is caused to impinge upon a vibrating diaphragm, which is properly damped and arranged, as will be readily understood by those versed in telephony. To the center of the diaphragm $d$, Fig. 2 is fixed a vertical screen or shutter $s$ of mica or other light and stiff material, being attached by its center, and the outer corners rounded off a little to prevent their contact with the diaphragm during its backward vibrations, or to the left. It projects out at right angles to the plane of the diaphragm, and in this particular form is made opaque to prevent the passage of any light through it.

Fig. 3 is a vertical plan view; $s$ is the shutter, $d$ the diaphragm, $l$ is a powerful light throwing a beam of nearly parallel rays across to the screen or partition S, which has a long, narrow slit $m$ in it, through which the light passes and strikes the prepared surface, which in this case is represented as a strip of sensitized paper, fed at a regular speed over the rollers R R. As the diaphragm shutter $s$ in this form normally stands, its edges shut the light off from one-half of the slit, and in vibrating it covers up more or less of the strip, according to the extent of the vibrations. The paper strip being carried along behind the slit $m$, Fig.

4, the edge of the shutter will describe a curved line at the junction of the part $e^1$, not acted upon by the light, and $e$, which is acted upon, and by proper treatment the latter may be dissolved away or otherwise made transparent, in any well known way, as will at once be understood by photographers.

By varying the relative distances of the light, the shutter, and the slit or sensitive surface from each other, the apparent amplitude of the sound waves as recorded on the sensitive surface, can be increased without changing their forms. This method of amplifying the vibrations is often important, and can be applied for strengthening pulsations or variations in light or electrical currents, as well as in sounds.

Another way is to have two shutters, one on the diaphragm as before, only larger, and the other stationary, and parallel to but not touching it. These shutters are painted, or otherwise treated to make them opaque up to a certain point, the rest being transparent. These opaque edges are notched, so that at their junction they lap so as to form square or diamond spaces which are transparent, as in Fig. 5, where $s$ is the vibrating shutter, and $s^1$ is the stationary one. In this case, the slit in the screen before the paper strip is placed vertically, and the paper is fed past it horizontally. Consequently, as the movable shutter $s$ is vibrated to and fro before the other, these transparent squares or diamonds become alternately larger and smaller. But they should not quite meet nor be quite extinguished even by the greatest vibrations of the diaphragm. The result is to produce on the opaque negative strip transparent lines of varying width, one of which is shown enlarged in Fig. 6. If a narrow beam of light is sent through it, it will be more or less obscured at different places along the strip, i. e., the quantity of light allowed by the transparent parts of the strip to pass through the slit will be increased or decreased, corresponding exactly to the pulsations of the diaphragm (or the sound waves,) not only in number and intensity, but also in the form or manner of vibrating.

At 2, Fig. 6, is seen a fine opaque line in the middle transparent strip. This is made by placing a fine wire across the center of the stationary slit $m$, to stop the light and indicate the center of the negative strip. Its convenience will be manifest. In practice the stationary notched shutter $s^1$ is not necessary, as the slit $m$ is sufficient in connection with the vibrating notched shutter. These patterns or negatives, and others which can be made by the above described method, are suited for different uses. It is evident that when a correct negative is once obtained, perfect copies can be produced not only by photographic but also by ordinary printing processes, or even by mechanical means, at a merely nominal cost, even for the most elaborate negatives.

Having thus explained the principles of the present invention, Fig. 7 represents an apparatus which has been devised for carrying out the method and producing the record. At A is a roll of the prepared negative strip, wound upon a bobbin, which is mounted in journal bearings in any convenient way. This strip may be of any suitable thin and flexible material, which may be strong fine paper, but what is known as paper parchment is preferred, although many other substances, may be used. It should be covered with a thin film made very sensitive to light, by any of the instantaneous processes employed in photography, although a dry process will be most convenient with this form of negative. After being properly coated and sensitized, it should be carefully dried, rolled up, and protected from light or damp till ready to use it. It may be thus coated and sensitized either before or after being cut up into strips of width suitable for use, but in the latter case care must be taken in the cutting not to disturb the adhesion of the film to the strip. A suitable width is ½ or ¾ inch, and the length will of course be governed by convenience, or the choice of the operator.

The roll A is free to turn, being held only by the spring 1, pressing upon it sufficiently to prevent it from turning faster than the strip is needed. From A, the strip passes over the flanged rollers R R, Figs. 3, 4 and 7; at $R^1$ is a rubber-faced roller which presses the paper strip between itself and R, tightly enough to prevent the slipping of the strip. It also fits between the flanges of the roller enough to carry that along with it. If desired, it can also press lightly on the roller $A^1$, to assist in rewinding the strip upon it. To this roller can be applied the power which feeds the strip along before the slit $m$ in the screen or partition S. For experiment, or common telegraphic purposes, a crank may be attached to the roller $R^1$ or R, as shown in Fig. 7, or the strip may be otherwise fed by hand. But when accuracy is required, some motor should be employed which will give the negative a perfectly uniform and known rate of speed. These are not new, and need not be described, as they form no part of my invention. The motor may be attached to or contained in the box or frame of the phonograph, or otherwise connected, as preferred.

The strip being thus fed along at a uniform speed, it is wound upon a second roller $A^1$, or may simply be fed loosely into the bottom of the box or case of the phonograph. It will now remain unchanged, if kept from light and damp, for days or even weeks,—or, on the other hand, it may be at once developed, intensified, fixed, or otherwise treated, to render the image permanent,—according to the process employed or the effect desired. All of which will be at once understood by those versed in photography, who will be enabled, from the foregoing description, to readily make a negative strip having the characteristics required, and will probably prefer the gelatin-bromid process. If the paper seems to have a greasy nature, it may before applying the bromid emulsion, be coated with a 4 per cent. solution of white of egg, to which sufficient chrome alum has been added to give it a slight bluish tinge. This will insure the film adhering perfectly, but it will seldom be required if a good quality of paper or parchment is used. These strips being fixed, they may be treated and used in different ways. The parts acted upon by light may be made transparent, and the rest blacked and rendered more opaque, and the strip used by transmitting light through it; or the strip may be left opaque, and used by reflected light,—in which case the parts acted upon by light should be made as white or brilliant, and those yet not acted upon as black and absorbent of light as possible, all of which can be done by any one out of many well known ways, and detailed directions are not necessary. For example, a strip to be used by transmitted light may have the dark parts blacked with carbon ink, flexible black varnish, or otherwise, and the lights rendered transparent by dipping in caster oil thinned with absolute alcohol.

The finished strip being again wound upon the wheel or roller A and properly arranged in the phonograph, we can reproduce the original variations in the first beam of light, in another beam of light, by feeding the strip before the slit $m$ at the same speed as when making the negative, and throwing the beam of light through it as it passes the slit. To do this, the diaphragm $d$ with its shutter is removed,—the upright frame which holds it being arranged to slide on a foot-piece which fits in grooves, so that it may be slid into its place for use or moved back out of the way, as desired. The square chamber which contained the diaphragm is now empty or free, and allows the light $l$ to shine unobstructed across it, to and through the slit $m$, onto and through the strip which is rapidly fed before it, whereby the light which passes through the strip is varied in precisely the same manner as the original beam of light was varied by the shutter on the diaphragm D; i. e., the greater the proportion of the strip which is transparent, the longer the beam of light which is passed through it, and vice versa, (see Fig. 4). This light can now be used to produce corresponding variations or pulsations in sound, electric currents, magnetic attractions, etc., as desired. This varying light can be converted into sounds in different ways. It may be passed through a plano-convex or rather plano-cylindrical lens $p'$, or any suitable optical device, to widen and disperse it properly, and be thrown directly upon a thin, hard-rubber diaphragm D, properly arranged for speaking or giving out sounds. Or, in place of the lens $p'$, a selenium bar or cell may be arranged to receive the light and thereby vary a current of electricity flowing through it, as shown at $p$ in Fig. 11, which current may then be conducted to a suitable telephone, which is substituted for the diaphragm D, and the sounds will be produced by it with any desired loudness. Or the current may be conducted by wire to any other instrument or place, in the same way as in telegraphy, and there converted into sounds or utilized for any other purpose, as in Fig. 11, where a current from D is represented as conveyed to a telephone T' at one place and to an electrical receiver of any suitable kind El' at another place.

When selenium is used for receiving the light and varying an electric current, it may be either in the shape of a bar $p$, covering the slit $m$, as shown in Figs. 9 and 11 or that of a flat cell $p^1$, in Fig. 10, where the light passing through the negative or pattern P and the slit $m$ is converged by the lens $p$ to a focus upon the selenium cell $p^1$.

The negative may of course be taken on glass, instead of paper, and arranged to be properly moved before the slit and light. Any suitable material may be used, whether transparent or opaque, flexible or rigid, plane or curved. When the negative strip is required to be very narrow, in order to save room, instead of the light falling directly upon it, the varying light beam may be received upon a lens and converged to the desired size before being thrown upon the sensitive surface. The negative, in Fig. 7, would then be fed along at D, instead of between $p$ and $m$. Or, in Fig. 10, the negative would be at $p^1$ while receiving the photographic impression. Fig. 16 illustrates this arrangement. The light from $l$, after being varied by the shutter $s$ passes through the slit $m$ and is converged by the lens $p$ and then falls upon the negative P. Of course, the same arrangement may be used with a speaking diaphragm D or other suitable device substituted for the negative or sensitive surface. As the interior of the camera is thoroughly blacked, as already stated, it absorbs all superfluous light and improves the effect.

When using an opaque strip or negative, the sound waves, or, rather, the variations of light produced by them, are recorded in the same way as already described, but to reproduce those variations, the strip is fed along with the printed or formerly sensitive side outward, in the path of a beam of light, by which it is powerfully illuminated, and the light reflected from it is utilized instead of transmitted light. Fig. 8 shows the arrangement: $l$ is the light, which passes through the alum-water cell 2, through the tube 3, and illuminates the moving strip 4. 5 is a tube with blackened interior, each end having an aperture corresponding to the slit $m$, and so directed toward the strip that only the light from that part of the strip which would be covered by the slit $m$ can pass through both apertures,—all of which will be readily understood by photographers. This light is then received by the lens, or other suitable optical device, $p$, and properly thrown upon the diaphragm D, as before. Or the lens $p$ may be replaced by the selenium bar or cell, and the diaphragm D by one of my telephones, etc., exactly as before described for transmitted light. The distance of the illuminating arrangement from the negative strip is merely sufficient to thoroughly light up the field covered by the tube 5. Tubes 4 and 5 may be of any suitable size, length, and material, all of which may be left to the judgment of the operator, who should arrange the apparatus according to good photographic practice.

Instead of a negative arranged as before described, it may be made alike across its whole width and its transparency varied so as to be more or less opaque at different parts of its length. Or an opaque strip may be similarly varied from white through all the shades to black so that a given cross-section of the strip will reflect more or less light at different points. Such strips will light up the whole length of the selenium or other device all the time and operate by the varying intensity of the light instead of by varying the length of the cell exposed to light. Or the strip can be so prepared as to show analogous gradations of phosphorescence, when suitably treated, and throw out a light of greater or less strength corresponding to the variations in the beam of light originally employed in making the negative whereby it will be enabled to reproduce those variations at any time, which is the object and function of the negative or "pattern". Or, the desired effect can be attained in many other ways.

The pattern may be made upon a long narrow strip, as described, or arranged spirally over the surface of a plate as in Fig. 12 or a cylinder of any suitable size, shape, and material as in Fig. 13. By making it in a circular form, as in Figs. 14 and 15 and running it around, it will continue to repeat the same sound, word, or phrase, as long as it is turned.

Instead of the hard-rubber diaphragm D, one of celluloid may be used, also soft vulcanized rubber, thin elastic brass and german silver, and other materials. The diaphragm $d$ may be made of any of the materials used in telephony, which are suitable for the employment to be made of it in this process.

The light employed for making the negative should be strongly actinic, and may be direct sun light, or electric or other artificial light having sufficient actinic power for instantaneous photography. It should be arranged in a chamber W, preferably with a reflector or other means for making the rays nearly parallel. At 2, Fig. 7, they pass through a glass cell filled with alum water, to stop the heat without diminishing the light. They then pass through an aperture of suitable size, across the diaphragm chamber, where they are manipulated by the shutter $s$, and through the slit $m$, as already described. For using the negative, so strong a light will not always be needed, and a good kerosene lamp will answer for most ordinary purposes. Gas light is not suitable, unless a steady flame can be obtained, as a flickering light will interfere with the perfection of the speaking. For purposes requiring accuracy, however, a light should be used having ample actinic power, and the stronger the better. No harm can be done by having a light unnecessarily strong as it cannot be strong enough to do any harm.

The whole apparatus is inclosed in a close box or casing, as shown in Figs. 7, 11, 16 and 17, to exclude external light, particularly from the negative. The light chamber W should be so tight that none of the light can penetrate the partitions around it, except through the cell 2. The diaphragm chamber is also inclosed on all sides except the one facing the sounds to be recorded, and the only opening on that side is through the bell or mouth-piece conducting the sound to the center of the diaphragm. All the interior surfaces are made densely black, in order to absorb and prevent the reflection of any light that may find its way inside. Suitable openings or doors are provided wherever necessary, for giving access to the different parts, which may be arranged to suit the convenience of the operator. This care about the light is required more especially while making the negative. For speaking purposes much less caution is needed.

By suitably attaching the expansion wires of my telephone to the diaphragm $d$ of the phonograph instead of to its own diaphragm $d$, my phonograph will make negatives of the sounds or signals transmitted to it over the line in connection with the telephone. This arrangement is shown in Fig. 11 (also in Fig. 17). The telephone is designated by $El$, the base of which slides in the cleats $t\ t$ to the position shown by the dotted lines at its ends.

$c\ c$ are the suspension wires running to the cross piece $u$ which is attached to the diaphragm $d$ which is carried by the base of the telephone and, consequently, moves with the binding posts at the other ends of the wires $c\ c$ when the diaphragm and shutter are to be moved back out of the way—thus avoiding any disarrangement of the telephonic adjustments thereby.

T is the telephone telegraphic instrument or other apparatus which transmits sounds, electrical impulses, or signals from a distance to the telephonic devices $El$ by means of which those influences are enabled to actuate the phonograph and produce records or "patterns" thereof as already described. The same apparatus $El$ can, of course, be employed for transmitting messages, etc., as well as for receiving them.

The phonograph can, therefore, remain in the office and the speech, music, or signals be transmitted to it by telephone for record and preservation.

Fig. 18 shows the general arrangement of the apparatus in more detail than Fig. 7. When in use the works are shut in by tight doors, as in Fig. 20, where O is the mouth piece through which vocal or other sounds are thrown on the diaphragm D. This mouth piece may be a deep bell-shaped cavity directly over the diaphragm or be fitted to the face and be connected by a tube ending over the diaphragm. The effect is much increased by having the mouth piece fit closely to the face of the speaker. $El$ represents an electrical apparatus capable of vibrating the diaphragm D when a telephonic, telegraphic or other suitable current is passed through it and thereby vibrating the shutter $s$ placed in the path of the beam of radiant rays from $l$ here shown as an electric lamp, and thus varying said beam in accordance with the extent and character of its own movements. The beam thus varied is in the first instance thrown upon the sensitized strip P fed down from reel A over guide roller R before the opening or slit $m$ on to another reel $A^1$. The strip having been properly treated to bring out and fix the image thus obtained and render it suitable for use as a pattern, as before described, it is again wound upon reel A and its end hooked to reel $A'$. The apparatus $El$ is moved back far enough to take shutter $s$ out of the beam of radiant rays which then pass through the negative and are varied thereby as they had been previously varied by the shutter $s$, after which they fall upon a selenium cell or other suitable apparatus $p'$, all as heretofore explained.

Fig. 19 is a horizontal section through the lines $x$—$x$ of Fig. 18, showing the light and lenses $l$, alum cell 2, shutter $s$, cylindrical lens $p$ which converges the light laterally to a long narrow streak where it passes through the opening $m$ to strip P. The set-screws $t'\ t'$ adjust the forward position of the block $t^2$ on apparatus $El$ to bring the shutter $s$ to the right point. $p^2$ is a small selenium cell which serves to automatically start off the strip P when the phenomenon occurs which is to be recorded. The shutter $s$ is caused to vibrate, as already stated, and thereby uncovers the cell $p^2$, allowing the light which had previously been stopped by the shutter to fall upon the cell and by increasing its conductivity an electric impulse is sent through the starting magnet $M'$. This immediately pulls up the armature and lever L and raises the pawl which had previously held the reel $A'$, whereupon the reel is suddenly revolved and draws the strip P past opening $m$ until the sound or other phenomena ceases, when the shutter becomes still, the current substantially ceases to flow through the cell $p^2$ and magnet $M'$, the lever L drops and the reel $A'$ is stopped. When reproducing the recorded phenomena the lever L is lifted manually by a cord $a$ running over a pulley through an aperture to the outside at some accessible point, where it can be pulled when desired. The current of the cell $p^2$ can also be sent through induction coil I and transmit the message if desired to a telephone T at the same time that it is being recorded on P.

The shutter may be attached directly to the center of the diaphragm, or at the end of a light lever, as in Fig. 18 pivoted in a bar or support $b$. The diaphragm being connected to the short arm of the lever $a$ greatly increased motion of the shutter is obtained.

What is claimed is:

1. The combination with a source of light rays, of a photo-sensitive surface, means for moving said surface across said light rays, and means for controlling the intensity of said rays reaching said surface at different points longitudinally of the surface by and in accordance with sound waves whereby a record varying in density longitudinally will be produced.

2. A sound record varying in density longitudinally in accordance with sound waves.

3. A photographically produced sound record having a coating or surface varying in density longitudinally of the record in accordance with sound waves.

4. A photographically produced sound record having a coating or surface of substantially uniform width varying in light transmitting capacity at different points longitudinally of the record in accordance with sound waves.

5. A sound record consisting of a record blank having a record thereon of substantially uniform width varying in light transmitting capacity longitudinally of the record in accordance with sound pulsations and capable of reproducing the sound.

6. A sound record consisting of a record blank photographically affected with varying intensity longitudinally of the record line in accordance with sound pulsations and capable of reproducing the sound.

7. The combination with a source of light rays, of a photo-sensitive surface, means for moving said surface across said light rays, and means for controlling the intensity of the rays reaching said surface independently of their lateral position by and in accordance with sound waves.

8. The combination with a movable photo-sensitive surface, of means for moving it, means for directing a stationary beam of light upon said surface, and means for cutting off more or less of the rays constituting said beam transversely of the line of movement of said surface by and in accordance with sound waves whereby a record varying in density longitudinally will be produced.

9. In a device of the class described, the combination with a movable photo-sensitive surface, of means for moving it, means for directing a stationary beam of light upon said surface, a speaking diaphragm, and a shutter carried by said diaphragm with its edge arranged transversely of the line of movement of said record surface adapted to cut off the rays of said beam reaching said surface by and in accordance with the sound pulsations of said diaphragm.

10. The process of making sound reproducing records which consists in directing a fixed beam of light upon a moving photo-sensitive surface, cutting off the rays of said beam transversely of the line of movement of said surface by and in accordance with sound waves and developing and fixing said record.

11. A pattern of sound pulsations varying in density longitudinally in accordance with sound waves and capable of use as a master record in producing therefrom commercial copies capable of reproducing the original pulsations of sound.

12. A pattern or negative photographically affected in a line varying in density longitudinally in accordance with sound pulsations and capable of use as a master record in producing therefrom commercial copies capable of reproducing the original pulsations in sound.

13. The process of making sound reproducing records which consists in photographically affecting a sensitive surface with varying intensity longitudinally in accordance with sound pulsations.

14. The process of making sound reproducing records which consists in photographically affecting a sensitive surface with varying intensity longitudinally in accordance with sound pulsations, and so treating said record as to render the varying effects fixed and more pronounced.

15. The process of making sound reproducing records which consists in photographically affecting a sensitive surface with varying intensity longitudinally in accordance with sound pulsations, and making from the record so produced commercial sound records.

In testimony whereof I affix my signature in presence of two witnesses.

JOSEPHINE H. FRITTS,
*Administratrix of the estate of Charles Edgar Fritts, deceased.*

Witnesses:
GEORGE L. GIBBS,
FRANCES E. FRITTS.